(No Model.)

J. WALKER.
FRICTION CLUTCH.

No. 441,726. Patented Dec. 2, 1890.

WITNESSES.
Frank Miller.
Albert H. Bates.

INVENTOR.
John Walker
By his attorney
E. L. Thurston.

THE NORRIS PETERS CO., PHOTO-LITHO., WASHINGTON, D. C.

UNITED STATES PATENT OFFICE.

JOHN WALKER, OF CLEVELAND, OHIO.

FRICTION-CLUTCH.

SPECIFICATION forming part of Letters Patent No. 441,726, dated December 2, 1890.

Application filed October 6, 1890. Serial No. 367,173. (No model.)

*To all whom it may concern:*

Be it known that I, JOHN WALKER, a citizen of the United States, and a resident of Cleveland, in the county of Cuyahoga and State of Ohio, have invented certain new and useful Improvements in Friction-Clutches, of which the following is such a full, clear, and exact description as will enable others skilled in the art to which it appertains to make and use the same.

My invention relates to friction-clutches in which the engagement of the friction-surfaces results from the radially-outward movement of some movable part when said outward movement is produced by the longitudinal movement of a sliding sleeve transmitted through a toggle-link.

The objects of my invention are to strengthen the mechanism without increasing the weight of the parts and to preserve the adjustment of the parts.

My invention is shown in connection with the form of clutch shown and described in my patent, No. 421,322, dated February 11, 1890; but it is not my intention to limit my claims to the mechanism described, only when used with this form of clutch, because it is obvious that it is equally applicable to any clutch in which a radially-movable part is caused to move outwardly by the longitudinal movement of another part transmitted through a toggle-link.

Figure 1:
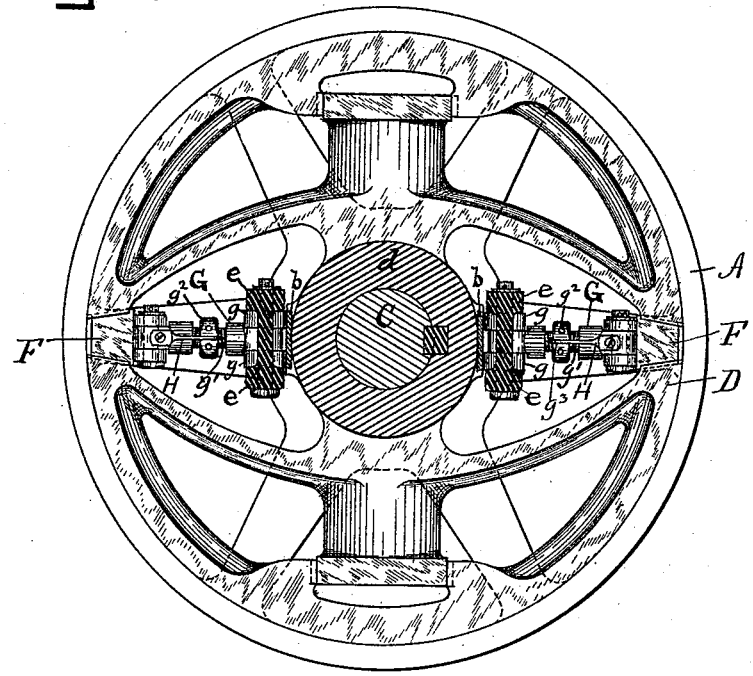
Figure 2:
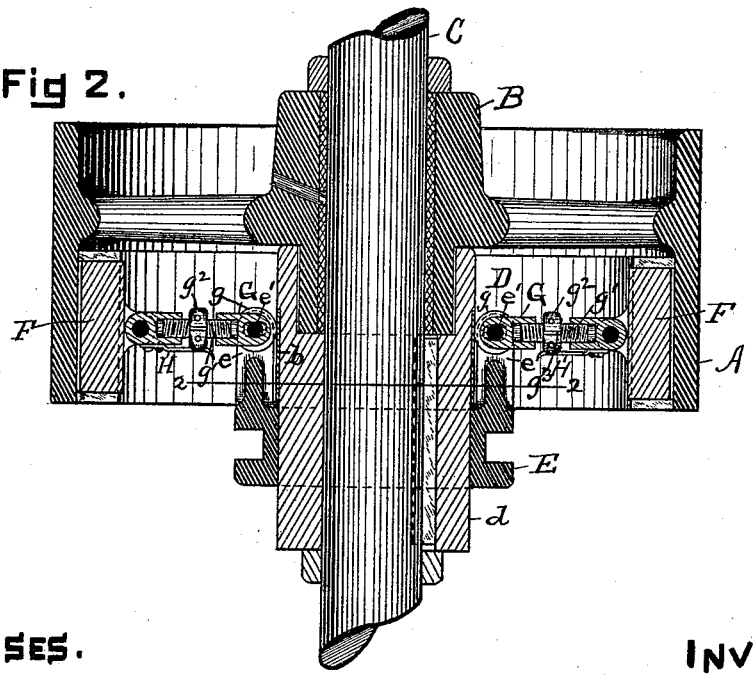

In the drawings, Figure 1 is an end elevation of the clutch, the hub and sleeve being cut away at the point indicated by line 2 2 in Fig. 2. Fig. 2 is a central sectional view of the same.

Referring to the parts by letters, A represents a cylindrical flange suitably attached to a hub B, which is mounted loosely on a shaft C. This cylindrical flange serves as the female-clutch member.

D represents an expansible band suitably connected with a hub $d$, which is keyed or otherwise secured to the shaft. This expansible band serves as the male-clutch member. This band is expanded and forced into frictional engagement with a cylindrical flange by the outward movement of the wedges F F, which are interposed between the proximate ends of the band-sections.

E represents a sleeve adapted to be moved longitudinally on the hub $d$. This sleeve is provided with as many pairs of ears $e\ e$ as there are wedges, and between each pair of ears one end of a toggle-link G is pivoted by means of a pin $e'$. The perforations in the ears $e\ e$, through which said pin passes, are vertically elongated, as shown by dotted lines in Fig. 1. The other end of each link is pivotally connected to a wedge F. Mounted on the pin $e'$ between the ears $e\ e$, and one on each side of the link G, are the friction-rollers $g\ g$, which as the sleeve is moved along the hub roll on a flat surface $b$ on said hub $d$. This relieves the ears $e\ e$ of all the breaking-strain and makes it possible to make them much lighter than would be necessary in other constructions. The flat surface on the hub upon which the rollers ride is made more durable by forming it of a smooth steel plate dovetailed into the hub, as shown.

The link G is made adjustable in length, so as to compensate for wear. The two independent ends of the link are provided with screw-threaded sockets, into which are screwed the ends of the right-and-left screw $g'$. A head $g^2$, formed on the screw between the two threads, affords the means whereby it may be revolved for the purpose of lengthening or shortening the link. Secured to one of the ends of each link is a spring H, the free end of which snaps into one of the slots $g^3$ or other depressions in the periphery of the nut $g^2$. By these means the adjustment is maintained against accidental displacement of the clutch.

Having thus described my invention, what I claim as new, and desire to secure by Letters Patent, is—

1. In a friction-clutch, in combination, a radially-movable part, a longitudinally-movable sleeve, a link, a hub upon which said sleeve slides, and friction-rollers at the inner end of the link, adapted to bear on said hub, substantially as and for the purpose specified.

2. In a friction-clutch, in combination, a radially-movable part, a longitudinally-movable sleeve having ears, an adjustable link pivotally connected to the radially-movable part and to said ears, friction-rollers mounted on the inner pivot of said link, and a hub upon which said sleeve slides, having a flat bearing-surface for said rollers, substantially as and for the purpose specified.

3. In a friction-clutch, in combination, a radially-movable piece, a link pivotally connected therewith, a hub having a flat bearing-plate dovetailed thereto, a sleeve slidable on said hub and having ears *e e*, a pivot-pin connecting the inner end of the link to said ears, and friction-rollers mounted on said plate, substantially as and for the purpose specified.

4. In a friction-clutch, in combination, a radially-movable piece F, the sliding sleeve, a link composed of two independent end pieces, and a connecting-screw having right and left hand threads and a head intermediate of the oppositely-threaded ends, said head having peripheral depressions, and a spring-arm secured to one end of said link and engaging with the depressions in the head, substantially as and for the purpose specified.

JOHN WALKER.

Witnesses:
ALBERT H. BATES,
E. L. THURSTON.